INVENTOR.
WILLIAM O. MUNROE

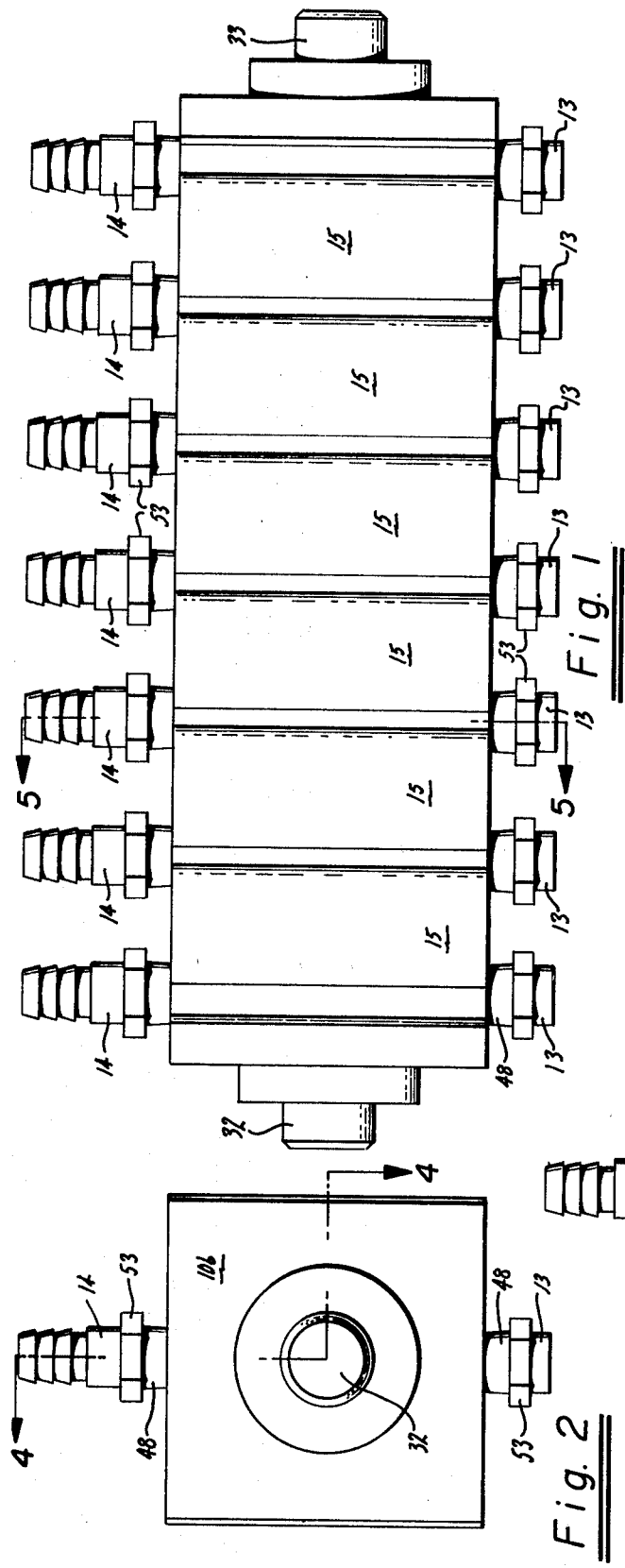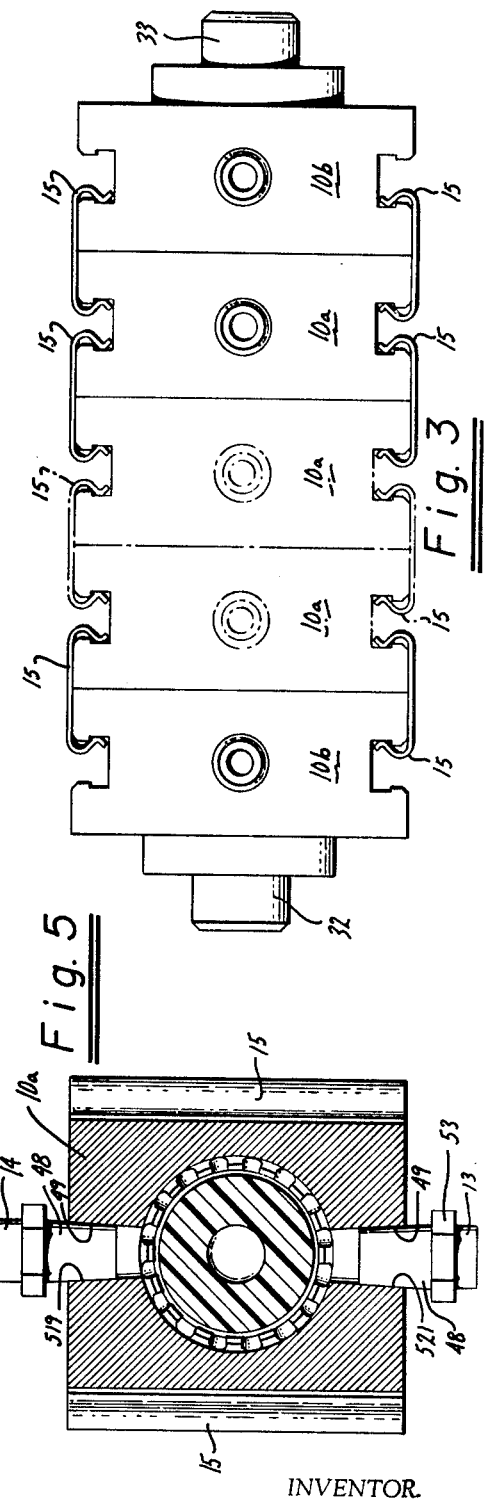

INVENTOR.
WILLIAM O. MUNROE

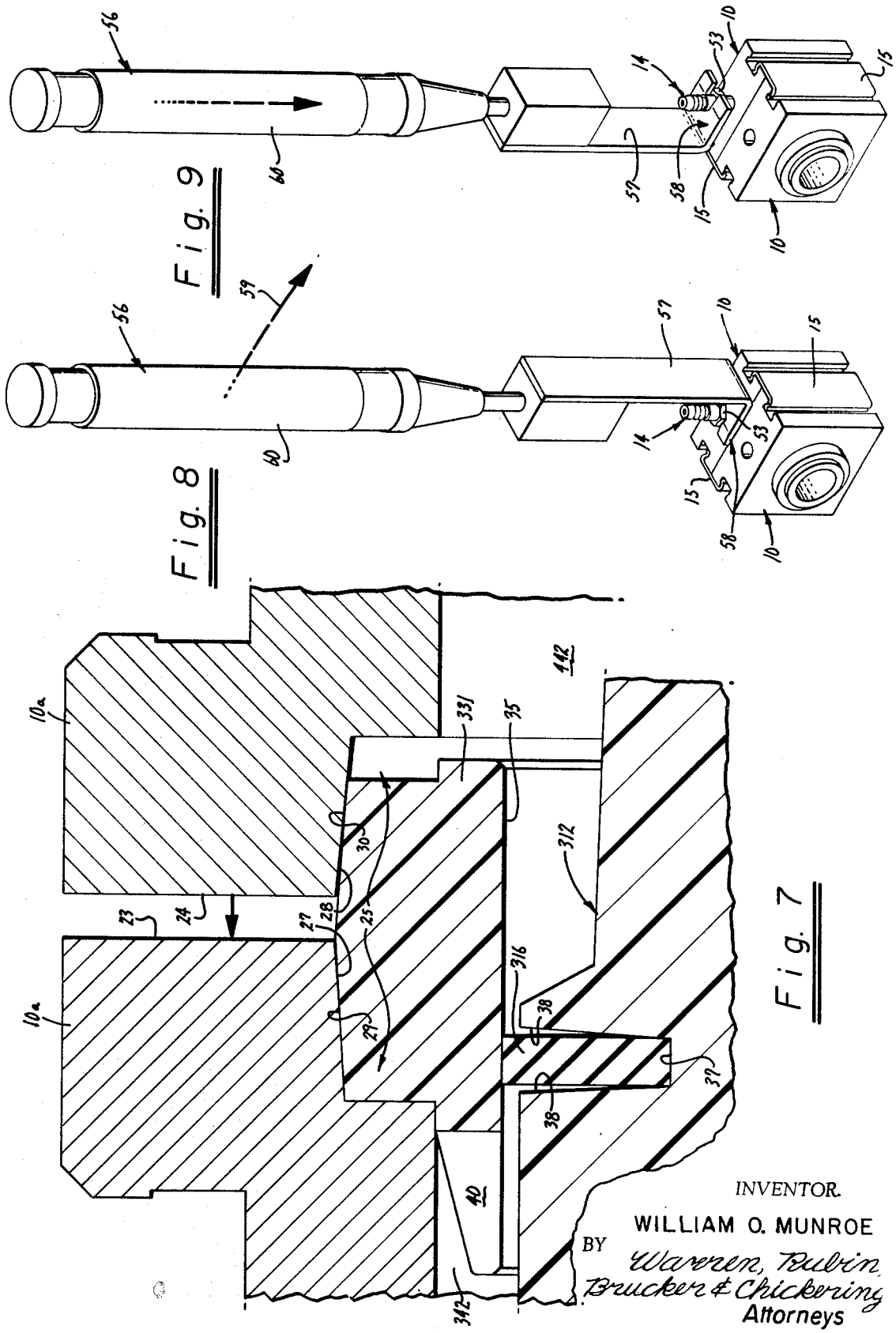

United States Patent Office 3,516,442
Patented June 23, 1970

3,516,442
MODULAR VALVE AND OPERATOR FOR FLUID LOGIC AND CONTROL SYSTEM
William O. Munroe, Rodeo, Calif., assignor to Amot Controls Corporation, a corporation of California
Filed Feb. 21, 1968, Ser. No. 707,271
Int. Cl. F16k 11/02, 31/143, 51/00
U.S. Cl. 137—625.66                                7 Claims

ABSTRACT OF THE DISCLOSURE

A sectionalized modular valve system having a minimum number of component parts including a series of end and end stacked housing sections with individual valving and control machanisms, each including a hollow annulus, mounted between each pair of sections and providing both the sealing means therebtween and an internal working cylinder for slidably receiving and cofunctioning with an internally positioned valve and/or control. Additional features include rectangular cross section valve sealing rings providing a minimum valving stroke; tapered annular members providing for easy attachment and detachment of fluid coupling or plug fittings, and spring clip fasteners engaging and securing adjacent sections into an assembled modular valve unit wherein each individual section is removable without disassembly of the entire valve.

---

The invention relates to the field of fluid logic and control valves as exemplified by U.S. Pat. No. 3,202,170 and No. 3,315,702.

Briefly, fluid logic and/or control pertains to the principle of operation of certain fluid valve systems particularly designed to provide many if not all of the functions characteristic of the entire control field, including such fundamental operations as AND, OR, NOT, NAND/NOR logic as wel as time and memory functions. Since many of these operations features are analogous to functions performed by electrical apparatus and because of the basic differences between electrical and fluid systems there are numerous applications wherein fluid systems are preferred. Particularly among the beneficial features exhibited by fluid control systems, is the ability to reliably operate under environmental conditions hazardous to electrical components such as particle or electromagnetic radiation, electrically conductive fluids and unusually large temperature variations. In employing such fluid control systems, it has been found that modularization of a fluid valve structure into interchangeable parts and subassemblies is particularly worthwhile, due to the accompanying allowance for a variety of valve control configurations and functions somewhat like the numerous electrical networks which may be designed from fundamental electronic components.

While the above mentioned patents disclosed devices which in many respects provide modular valve systems capable of performing fluid logic and control functions, they are to be considered precursors in a field which now demands a practical embodiment in terms of economy, operability and serviceability.

It would be desirable, inter alia, to decrease the number of parts, simplify each one into a universal and easily manufacturable unit, and still provide a modular valve system having the necessary coperating features of the reliable and versatile valve, such as, substantial sealing between appropriate component parts, increased interchangeability of parts and ease of maintenance and service. Equally significant to or at least a controlling need of the user of fluid logic or control devices is a system wherein the component parts are not only interchangeable but are organized into a universal source of cooperating and compatible parts providing a generally unlimited number of variety of value assemblies, including actuators for operating the valve mechanisms, fastening attachments, fittings, assembly and disassembly tools, etc.

Accordingly, it is a broad object of the present invention to provide a compact sectionalized modular valve assembly having a minimum number of parts, most of which are interchangeable to provide a maximum number of assembled configurations for heretofore unobtainable versatility.

It is a further object of the invention to provide a valve assembly, having positive intercomponent sealing characteristics, notwithstanding the decreased number of parts.

An additional object of the present invention is to provide a compact sectionalized modular valve employing interchangeable parts, each part being easily and economically manufacturable as a separate unit so as to reduce both the cost of the whole assembly and the cost of replacement parts.

Another object of the present invention is to provide a sectionalized modular valve featuring ease of assembly and disassembly, both of which may be quickly accomplished with a few simple tools.

Another object of this invention is to provide a modular valve having the capability of heretofore unobtainable high operating speeds.

It is an overall object of the present invention to provide a sectionalized modular valve wherein each of the features thereof cooperate not only to provide a system capable of performing an heretofore unobtainable wide variety of fluid control functions, but also a system which allows the user to rapidly rearrange the parts thereof and make up original assemblies, for performing such various functions, with a minimum number of assembly and/or disassembly steps.

Referring to said drawings:

FIG. 1 is a front elevation of an assembled seven-section, double-piloted, four-way valve constructed in accordance with the present invention;

FIG. 2 is an end view of the valve shown in FIG. 1;

FIG. 3 is a side elevation of the valve shown in FIG. 1 with two of the intermediate sections removed;

FIG. 5 is a cross sectional end view taken along line 5—5 of FIG. 1;

FIG. 7 is an enlarged, fragmentary cross sectional view of a portion of the valve;

FIG. 8 is a perspective view of a tool and a section of the valve with which it is used for removing a press-fit fluid fitting;

FIG. 9 is a perspective view similar to FIG. 8 but showing the use of the tool for setting the fluid fittings according to a pre-selected impact force.

Figure 4:
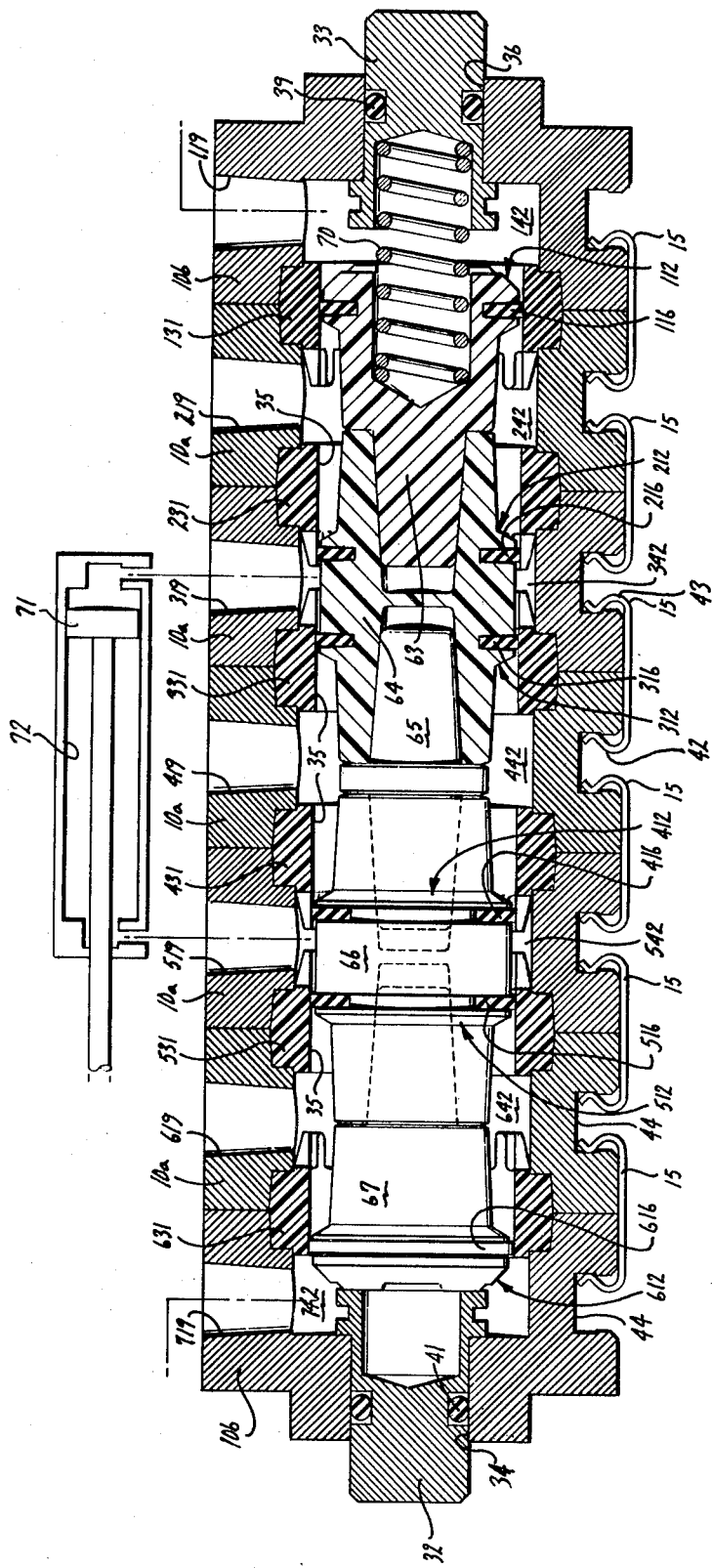
FIG. 4 is a cross sectional view of the valve taken generally along orthogonal lines 4—4 of FIG. 2.

One of the principal objects of the instant invention is to provide a minimum number of universal parts capable of being arranged into a maximum number of unique valve assemblies. As best illustrated in FIG. 4, such universal parts including housing sections 10 including intermediate sections 10a and terminal sections 10b which together provide a housing structure for mounting the valve and operator mechanism therein; a series of annuli 131, 231, 331, 431, 531, and 631 mounted in sealed engagement between housing sections 10, each being formed with an internal cylindrical wall for receiving sealing rings 116, 216, 316, 416, 516, and 616 in slidable sealed engagement therewith; annular members 112, 212, 312, 412, 512, and 612 forming a carrier for supporting sealing rings 116–616; and means here in the form of spring clips 15 for fastening adjacent sections 10 to one another; manual actuators 32 and 33 positioned for displacing annular members 112–612; and press fit fittings 13 and 14 best illustrated in FIG. 1. From these universal or basic parts, most of which are identical and the remainder having similar features, valve assemblies may be fashioned, one of which is of course shown in FIG. 4. Also, it is noted that each of the above-mentioned components may be separately manufactured in an economically attractive manner. For example, annuli 131–631 may be mass produced by high precision, low cost plastic injection molding of a suitable resiliently compressible, wear resistant, low friction thermo-plastic material such as Noryl manufactured by General Electric. A further significant feature of the valve relates to the assembly of parts without the aid of threaded or screw connections, which would tend to increase the assembly and diassembly time and burden the user with the occurrence of stripped threads and other undesirable characteristics of this type of connection. The present invention universally uses quick disconnect engagement means for joining the component parts. Each adjacent pair of housing sections 10 may be engaged and disengaged by easy and rapid manipulation of a pair of spring clips 15. Fittings 13 and 14 may be similarly mounted and demounted by simple one-step operations as respectively illustrated in FIGS. 9 and 8. Notwithstanding the above mentioned minimum number of fundamental parts and ease in assembly and disassembly, the invention provides substantial sealing by the unique provision of intercomponent tapered engagements.

Figure 6:
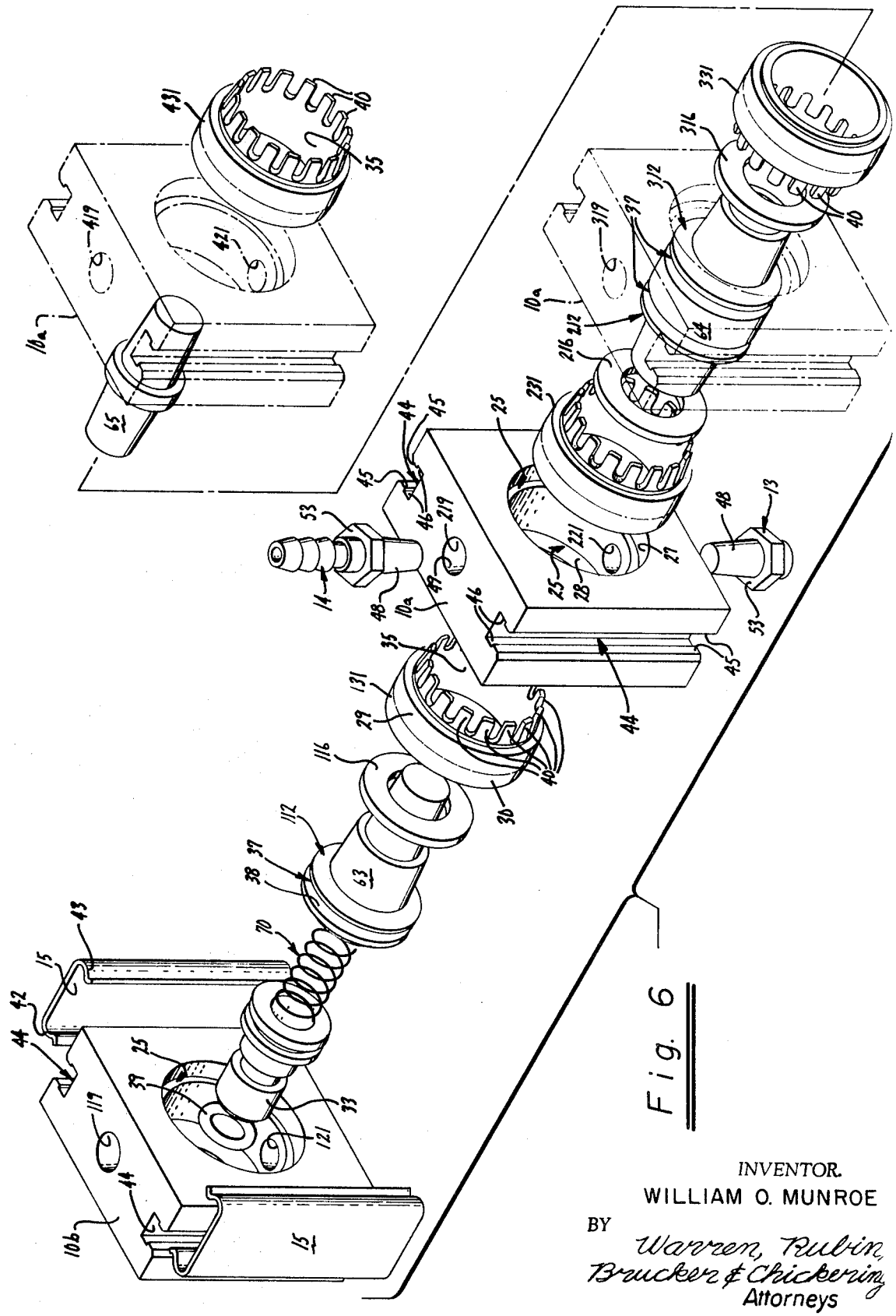
FIG. 6 is an exploded perspective view of various of the valve parts.

Referring now particularly to FIG. 4, showing a seven-section, four-way, double-piloted valve, each of housing sections 10 is provided with a pair of passages best illustrated in FIG. 6, respectively, passages 119 and 121, 219 and 221, 319 and 321, 419 and 421, 519 and 521, 619 and 621 and 719 and 721. With passages 121–721 blocked by plug fittings 13 as illustrated in FIG. 1, the four-way valve operates upon shifting the carrier formed by annular members 112–612 to the right or left to communicate passage 419 alternately with passages 519 and 319 by the engagement and disengagement of sealing rings 316 and 416 with internal cylindrical walls 35 of annuli 331 and 431. By the same axial displacement of members 112–612, a pair of passages 519 and 619 together with a pair of passages 219 and 319 are alternately connected and disconnected from one another by the engagement and disengagement of sealing rings 216 and 516 with cylindrical walls 35 of respective annuli 231 and 531. Thus, passages 219–619 give rise to the four-way operation of the valve assembly.

A pair of passages 119 and 719 are provided in terminal housing sections 10b communicating with chambers 142 and 742 for fluid pressure piloting of the valve assembly. Considering the piloting operation with spring 70 removed (the function of spring 70 will be discussed hereinafter), fluid introduced into passage 719 for example with passage 619 vented to atmosphere causes a differential pressure to occur across respective sides of annular member 612 forcing this member with mounted sealing ring 616 to the right along with the remaining annular members 112–512 of the carrier. By this operation, the controlled communication of passages 219–619 is shifted from a first position shown in FIG. 4, to a second mode altering the communication therebetween. Additionally, when annular members 112–612 are at rest in a position to the far right (second position) introduction of a pressurized fluid into passage 119 with passage 219 vented to atmosphere causes a similar axial shift of the annular members to the left or (first position) back to the position shown in FIG. 4. Annuli 131 and 631 together with annular members 116 and 616 provide pressure actuated pistons made up of parts identical to those used in valving portions of the device.

A pair of manually operated actuators 32 and 33 are provided within remote faces of terminal housing sections 10b and positioned for axially displacing members 116–616 between a first position located at the far left (drawing shows the annular members in the first position) and a second position located at the far right. Actuators 32 and 33 are mounted and retained within axial bores 34 and 36 of sections 10b and provided with O-rings 39 and 41 for circumferential sealing therebetween. With annular members 112–612 in the first position as shown in the drawing, actuator 32 upon inward manual depression shifts the annular members to the second position while actuator 33 similarly displaces the annular members from the second position back to the first position upon inward manual depression thereof.

Accordingly, the valve assembly as shown in FIG. 4 with the provision of a pair of manual actuators 32 and 33 and a pair of annular members 112 and 612 positioned for operating as pistons, provide a double piloted valve, that is, for example, annular members 212–512 may be axially displaced to the right by manual depression of actuator 32 or by introduction of pressurized fluid into passage 719.

With reference to FIGS. 6 and 7 each of the confronting faces, for example, faces 23 and 24 of housing sections 10 are provided with annular recesses 25 positioned in axially opposed registration for receiving annuli 131–631 in engagement therewith.

As a principal feature of the present invention recesses 25 are formed with internal annular and circumferentially extending walls 27 and 28, engaging annuli wall portions 29 and 30, wherein at least one of the walls is tapered to the axis for automatically compressing annuli 131–631 into a sealed relationship with housing sections 10 upon movement of faces 23 and 24 thereof to an assembled position as shown in FIG. 4. In a preferred embodiment, both walls 27 and 28 are tapered to the axis and together being inwardly divergent and both annulus wall portions 29 and 30 are tapered to the axis and together being outwardly convergent for sealing both pair of adjacent engaged walls upon assembly of sections 10 and annuli 131–631. By this feature, annuli 131–631 are to a large extent radially compressed into substantial self-sealed engagement between walls 27 and 28 and wall portions 29 and 30 upon movement of housing sections 10 toward one another into an assembled position as indicated in FIGS. 4 and 7.

It has been discovered that by tapering the walls of recesses 25 to a greater slope than the corresponding tapered walls of annuli 131–631, the compressive sealing characteristics of this arrangement is greatly enhanced. As shown in FIG. 7, as housing sections 10 are drawn together toward an assembled position the greater slope of walls 27 and 28 of housing sections 10 are particularly effective in placing greatest compressive pressure on the edges of annulus walls 29 and 30 proximate the opposed ends thereof, thus providing what may be characterized as a self-sealing engagement.

By generally forming the tapers on recesses 25 and annuli 131–631 to provide an angle from the axis so that the tangent of such angle is less than the coefficient of friction between walls 27–28 and 29–30, the annuli will hold the housing sections together in an assembled position without further fastening means so long as no internal or external forces are applied to separate the parts. This facilitates assembly of the components eliminating the requirement of a jig or some other means to maintain the parts in engagement during assembly of an entire unit.

Accordingly annuli 131–631 not only provide, by internal cylindrical walls 35, portions of the valving and fluid piloting mechanisms but also provide in cooperation with housing sections 10 a self-sealing feature and means for facilitating assembly.

Cooperating with annuli 131–631 are an equal number of member-mounted sealing rings 116–616 each forming an outer peripheral wall for engaging internal cylindrical walls 35 of annuli 131–631. Several of the sealing rings cooperate with the annuli to provide a valve mechanism, sealing rings 216–516, while the remainder, sealing rings 116 and 616 within annuli 131 and 631 operate as pistons and fluid seals between chambers 242–142 and chambers 642–742. Sealing rings 216–516, mounted about members 212–512, are axially positioned to reciprocate between engagement and disengagement with cylindrical walls 35 of an associated annulus. On the other hand, sealing rings 116 and 616 are mounted about annular members 112 and 612 and axially positioned with respect to the remaining annular members 212–512 to provide continuously sealed and slidable engagement with cylindrical walls 35 of annular 131 and 631 upon axial reciprocation of the annular members. Additionally, with the carrier for member 212–612 in the far left hand position as shown in FIG. 4, sealing rings 616 and 516 co-function upon fluid pressurization of chamber 642 to provide a force balancing piston which tends to maintain the carrier in its depicted position thereby providing a memory function. Sealing rings 116 and 216 operate in a like manner with the carrier in the far right hand position and chamber 242 pressurized. Accordingly, by the arrangements shown in FIG. 4 a valve assembly is provided wherein the individual valve mechanisms are formed of the same universal parts as the fluid piloting mechanism, the latter of which operate essentially as pistons.

Of particular importance in the instant invention is the provision of sealing rings 116–616 formed with a generally rectangular cross section, best shown in FIG. 7. By this rectangular cross section, the sealing rings provide a generally narrow or thin external cylindrical wall having decisive edges which minimizes the axial stroke length required for opening and closing the valve mechanisms. By decreasing the stroke length for each of the valve mechanisms the operating speed of the entire assembly is greatly enhanced. Furthermore, the rectangular edge sealing rings exhibit a smaller area of contact and less radial force with its co-functioning part as compared with an O-ring seal thus reducing frictional drag and further enhancing the operating speed.

Each of members 112–612, which provide a support for sealing rings 116–612, are formed with a circumferentially extending recess 37 (shown in FIG. 7) including inwardly converging side walls 38 for securing and sealing an inward portion of the sealing rings and being spaced from an outward portion of the ring to provide axial flexure thereof. By the provision of converging side walls 38, the portion of each of sealing rings 116–616 projecting outwardly and contacting cylindrical internal walls 35 is allowed to flex upon axial reciprocation thereof, thereby decreasing the bending stresses place on each sealing ring insuring long life and efficient sealing operation.

To provide a means for guiding each of sealing rings 216–516 into and out of engagement with internal cylindrical walls 35 of annuli 231–531 each of the annuli are provided with a multiplicity of circumferentially spaced fingers 40 extending axially from one end thereof as best shown on annulus 431 in FIG. 6. Fingers 40 provide not only a means for guiding sealing rings 116–616 into smooth engagement with cylindrical walls 35 but also apertures for fluid communication when the sealing rings, for example, sealing ring 216 as shown in FIG. 4, are resting on the inner surface portion of fingers 40. Communication is provided between passage 319 into an internal chamber 342 formed by one of housing sections 10, through the apertures formed by fingers 40 which circumvent sealing ring 216, into a regin defined by internal cylindrical wall 35 of annulus 231, through internal chamber 242 defined by another of sections 10 and out passage 219. Accordingly, fingers 40, which may if desired be formed on both sides of each of the annuli for an alternative valving mode, enhance the overall efficiency, smoothness of the operation and speed of the valve assembly and thus are advantageously included in the valve system of the invention. Fingers 40 on annuli 131 and 631 are not utilized in the illustrated assembly. As sealing rings 116 and 616 remain in slidable sealed engagement with internal cylindrical walls 35 throughout the operation of tthe valve to perform their function as pistons. However, due to the universal parts of the present invention, it is convenient to use an annulus with fingers 40 thereby eliminating an extra part.

Each pair of adjacent housing sections 10 are secured separately by a pair of spring clips 15 best shown in FIG. 3. Each of clips 15 is formed of a spring metal into a substantially C-shaped configuration having spaced apart legs 42 and 43 demountably engaging a pair of shoulders provided by a separate pair of sections 10. In an advantageous form of the invention, each of the sections 10 is provided with a pair of slots 44 on opposed sides thereof parallel to confronting faces 24 and 25 to provide shoulders 45 for receiving legs 42 and 43 of clips 15. Thus, each housing section 10 may be clipped to an additional similarly formed section in stacked modular arrangement substantially as shown. Moreover, by fastening only adjacent pairs of housing sections 10, the valve assembly may be easily repaired or altered without disassembling the entire unit. As shown in FIG. 3, any associated pair of spring clips 15 may be detached allowing separation of one pair of adjacent sections for service or part replacement without disengaging the remaining sections. Additionally, subassemblies may be assembled, each composed of several housing sections and including valve and piloting mechanisms for performing a particular fluid control function. Then, these subassemblies may be arranged in a desired configuration with one another or with another valve assembly by merely clipping the exposed face ends to similarly formed housing sections.

It has been found desirable in the case of spring clips 15 to provide undercuts 46 along each of shoulder 45 to enhance and secure the engagement of spring clips 15 therewith and to maintain the web of spring clips 15 generally flush with the housing sections to provide a neat compact unit.

As a feature of the present construction the entire assembly of parts is achieved without the requirement of time consuming threaded engagements.

Each of the passages, e.g. passage 119, leading to an inner chamber formed by sections 10 are shaped to cooperate with quick connect and disconnect fittings 13 and 14. Such fittings make up two types, in this case a plug fitting 13 and a fluid coupler fitting 14. Specifically, and as best illustrated in FIG. 5, each of fittings 13 and 14 are formed with a tapered external wall portion 48 mounted in mated pressed sealed engagement with similarly tapered internal wall portions 49 of passages 521 and 519 in this instance. Each of wall portions 48 and 49 are annular to define external and internal frusto-conical wall shapes necessary to insure a substantial seal therebetween. Each of fittings 13 and 14 are formed with annular shoulders provided by the upper and under side of integral flange 53 (shown in FIG. 5). In combination, the features of flange 53 and tapered portions 48 and 49 provide a quickly mountable and demountable fitting having substantial sealing characteristics even under the influence of relatively large fluid pressures. The ease and speed with which such fittings may be removed or inserted within housing sections 10 are best illustrated by FIGS. 8 and 9 wherein FIG. 8 shows a housing section 10 mounted with a fluid coupler fitting 14 in the process of being demounted by tool 56 while FIG. 9 illustrates the same structure with tool 56 in the process of mounting fitting 14. Referring now especially to FIG. 8, tool 56 is provided with bar extension 57 formed with a right angled bifurcated claw or foot portion 58 received between housing section 10 and the under side of flange 53 (shown in FIG. 5) of fitting 14. Upon insertion of bifurcated portion 58 of tool 56 as shown and manual application of a lateral force 59 to the handle of the tool, member 14 is removed from the passage by a resulting camming force provided by bifurcated portion 58.

As shown in FIG. 9, fitting 14 is quickly pressed into engagement with the associated passage by orienting bifurcated portion 58 of tool 56 on the upper side of flange 53 and pressing downwardly on tool 56. The handle portion 60 of tool 56 is comprised of a mechanism for providing a pre-selected and downwardly directed impact force upon cocking the mechanism by a downward motion applied on handle portion 60. Such a mechanism is used in impact center punches such as manufactured by Starret Corp. and accordingly is not shown in detail here. Thus, tool 56 drives fitting 14 into engagement with the passage wall causing a press fit seal to occur between wall portions 48 and 49 capable of withstanding substantial operating fluid pressures.

As an important feature of the invention, a taper on wall portions 48 and 49 of approximately ¾ of an inch per foot is best suited for achieving the objectives of rapid assembly and disassembly and excellent sealing consistent with the need to prevent pressure expulsion of the fitting and, by the use of tool of the character described, convenient insertion and removal of the fitting.

In mass manufacture of fittings 13 and 14 and the passages therefor, that it is preferable to set the tolerances such that unavoidably occuring mismatches between the tapered wall portions provide a smaller slope for the fitting wall portion 48 than for the passage wall portion 49. By this provision, in the case of mismatches, the nose end of fittings 13 and 14 is slightly distorted upon mounting of the fitting insuring a positive press fit engagement with wall portions 49 of the passages.

Referring again to the four-way valve as shown in FIG. 1, it will be appreciated that plug fittings 13 and fluid coupler fittings 14 may be rearranged with passages 119–719 and 121–721 to provide blockage and/or fluid coupling at any desired position along the valve assembly for allowing various configurations according to the circuit designers choice. For example, plug fitting 13 inserted in passage 121 as shown in FIG. 1 may be removed and replaced with a fluid coupler fitting 14 to allow the introduction of pressurized fluid into chamber 142 shown in FIG. 4, from separate sources thereby avoiding the need for additional fittings for joining such sources prior to the valve connection.

Returning now to the illustration of the valve as shown in FIG. 4, annular members 112, 212, 312, 412, 512, and 612 are axially coupled to one another and comprise a plurality of coupling elements 63, 64, 65, 66, and 67 having demountably engaged stud and socket portions providing a stacked buildup of the carrier. More exactly, each of coupler elements 63 through 67 is provided by an integral stud or socket extension of either one or a pair of annular members 112–612. For example, coupler elements 64 forms annular members 212 and 312 which in turn support sealing rings 216 and 316. By this arrangement, each of sealing rings 116–616 are securely mounted in fixed axially displaced relationship with one another to form a carrier for simultaneous axial reciprocation of the sealing rings upon shifting of the carrier. The provision of interjoining coupler elements 63–67 is preferred in many cases to increase the versatility of the component parts, for example elements 63 and 67 are identical as are elements 64 and 66. However, it will be appreciated, that the carrier structure formed by engaged elements 63–67 may be constructed of a single integral member in a manner similar to the formation of elements 64 and 66.

As briefly discussed above, the valve assembly shown in FIG. 4, providing four-way operation has the advantageous feature of double pilot control. Pilot control refers to the actuation of the valving mechanism which in turn controls the communication between the various passages. For example, a force displacing coupler elements 63–67 from the position shown in FIG. 4 to the right, would be referred to as piloting the valve. That is, upon such displacement, the various communications and isolations between passages 219–619 are altered by the movement of sealing rings 216–516, thus the term piloting of the valve. Double piloting, refers to the invention response to a pair of separate piloting forces at each terminal end of the assembly. In FIG. 4, such pair of piloting forces is provided at the left hand end by manual actuator 32 and introduction of fluid into passage 719 and at the right hand end of the assembly by manual actuator 33 and introduction of pressurized fluid into passage 119. Calling the position of coupler elements 63–67 at the far left as shown in the drawing, the first position and at the far right, the second position, the coupler elements may be shifted to the second position by inward depression of actuator 32 or by introduction of fluid into passage 719 with passage 619 vented to the atmosphere.

In this view, a logical OR function is presented by the alternative or double piloting feature just described. More explicitly, if the means depressing actuator 32 represents a first signal, and the introduction of fluid into passage 719 represents a second signal, the valve assembly is piloted to the second position by the appearance of either the first or second signal.

Other types of logic or control functions are achieved by the assembly shown in FIG. 4, with the inclusion of spring 70 mounted in compression between actuator 33 and coupler element 63. Spring 70 resiliently biases coupler element 63–67 in the first position which may now be characterized as the stable mode of the valve. Now, considering the introduction of fluid into passage 719 as a first signal, the first signal will pilot the carrier or coupler element 63–67 to the second position compressing a spring 70. Defining a second signal as the inward depression of actuator 32, it will be recognized that coupling element 63–67 will be shifted back to the first position only upon the removal of the first signal represented by fluid introduction through passage 719 into chamber 742 AND the removal of the second signal represented by depression of actuator 32. That is, spring 70 returns the carrier to its first position only upon the removal of both the first and second signals giving rise to an AND logic function.

Accordingly, as illustrated by the above simplified examples, the valve assembly is readily adapted to performing a variety of logical functions including the AND/OR logic modes.

In addition to logical functions, the valve assembly may be adapted with a bleeder valve arranged within appropriate passages to provide delayed control functions, i.e. time functions. For example, by momentarily pressurizing chamber 742 by the introduction of an impulse of fluid through passage 719, and then disposing a bleeder valve within passage 719 for slowly releasing such pressure, the valve will first be placed in the second position, that is to the far right, and slowly return to the first position by the force of spring 70 slowly forcing the fluid within chamber 742 out through the bleeder located within passage 719.

A similar function may be obtained in conjunction with a continuous fluid pressure signal applied to passage 719, by connecting a bleeder line between chambers 742 and 142. In this instance, the fluid pressures in chambers 742 and 142 will eventually equalize through the bleeder line thus balancing the axial pressure forces allowing spring 70 to return the valve carrier to its first position.

FIG. 4 shows the assembly operating in conjunction with a double acting piston 71 disposed for axial reciprocation in cylinder 72. Specifically, providing a conduit (diagrammatically illustrated only) between a right-hand portion of cylinder 72 and passage 319 and a second conduit between a left-hand portion of cylinder 72 and passage 519, and finally coupling passage 419 with a pressurized fluid supply, the valve operates to alternately force piston 71 between first and second remote positions. With coupler members 63–67 in the first position (to the left), fluid supply directed into passage 419 is communicated with the left hand portion of cylinder 72 via chamber 442, the aperture provided by fingers 40 of annuli 431, chamber 542 and passage 519. Thus, piston 71 is displaced to the far right wherein fluid originally in the right hand portion of cylinder 72 is vented the atmosphere via passage 319, chamber 342, the apertures provided by fingers 40 of annulus 231, chamber 242 and vented passage 219. In a similar manner by shifting coupler elements 63–67 to the second position, that is to the far right, piston 71 is displaced to the far left. In combining the operation of piston 71 with the logical piloting operation described above, it will be recognized that the position of piston 71 may be controlled by a pre-selected set of logic functions.

The above examples illustrate only a few of the many functions that can be performed by the valve. Furthermore by the use of various numbers of sections, many types of valves configurations are possible; such as, 2-way, 3-way, check valves and shuttle valves, etc. The only limitation is the imagination of the user.

I claim:

1. A quick detachable fluid connection in a fluid logic control system, the combination comprising, a housing formed with a fluid passage leading to an exterior surface of said housing and having an internal frusto-conical wall narrowing inwardly from said surface, a detachable fitting having an external frusto-conical wall narrowing to one end and dimensioned for insertion into said passage in mated wedge fit with said passage wall, said fitting being formed with an impact area substantially perpendicular to the longitudinal axis of said external frusto-conical wall, impact setting means formed to engage said area and providing a predetermined impact force for driving said walls into said mated wedge fit, said fitting being formed with a shoulder spaced from said housing surface in the inserted position of said fitting, and means having a claw dimensioned for positioning between and to bear against said shoulder and housing surface for prying said fitting from said passage.

2. The combination defined in claim 1, wherein said shoulder is formed with portions at and projecting laterally from diametrically opposite sides of said external wall, and said claw is bifurcated to straddle said external wall and to provide spaced claw ends dimensioned for engagement with said shoulder portions.

3. The combinations as defined in claim 2, wherein said external frusto-conical wall is formed with a slope relative to its axis smaller than the corresponding slope of said internal frusto-conical wall so as to insure the compression fit of said fitting end.

4. A quick detachable fluid connection in a fluid logic control system, the combination comprising, a housing formed with a fluid passage leading to an exterior surface of said housing and having an internal frusto-conical wall narrowing inwardly from said surface, an elongated tubular detachable fitting formed with an annular shoulder surrounding a midportion of said fitting and having opposite longitudinally spaced sides disposed in substantially parallel planes perpendicular to the longitudinal axis of the fitting, a first end portion of said fitting adjacent a first shoulder side being formed with an external frusto-conical wall narrowing to an end and dimensioned for insertion into said passage in mated wedge fit with said passage wall and disposing said first shoulder side in spaced relation to said housing side, the opposite end portion of said fitting adjacent the opposite second shoulder side being formed for connection to a fluid conduit, an impact setting tool having a bifurcated end dimensioned to straddle each of said fitting end portions for engagement with said shoulder surfaces, said bifurcated end engaging said second shoulder surface for applying a predetermined impact force thereto for driving said frusto-conical walls into said mated wedge fit, said bifurcated end engaging said first shoulder side and said housing side for prying said fitting from said passage.

5. In a valve, a valve housing comprising a modular assembly of at least three sections mounted in end-to-end relation about a longitudinal axis and providing an internal axially extending valve chamber, each of said sections having circumferentially opposed external wall portions, each formed with a pair of axially spaced shoulders having surfaces substantially perpendicular to said axis, said sections being formed with radial passages located circumferentially between said shoulders and extending from said chamber to the outside of said sections, a valve chamber mounted in said chamber for controlling fluid flow through said passages, the adjacent shoulders on adjacent sections being axially aligned, and a plurality of spring clips each having spaced apart legs engaging the shoulder surfaces of each pair of axially aligned adjacent shoulders to clamp said sections together, the space between the shoulders of each pair being sufficient to accommodate a pair of said legs whereby a pair of said sections may be clamped onto the opposite ends of an intermedially positioned section and said assembly may be opened between any pair of adjacent sections.

6. A valve as defined in claim 5, wherein said sections are each of rectangular form with said external wall portions disposed in flat diametrically opposed first sides and with said passages being formed to extend to flat diametrically opposed second sides right angularly related to said first sides, each of said first sides being formed with a transversely extending slot to provide said shoulders, each of said slots having a width accommodating the receipt therein of a pair of side-by-side mounted clip legs.

7. In a valve, a valve housing comprising a modular assembly of at least three sections mounted in end-to-end relation and providing an internal valve chamber, said sections being formed with axially aligned recesses in the confronting end faces thereof, a plurality of annuli one each being mounted in said recesses between each pair of confronting end faces and each being formed with an interior cylindrical wall, said sections being formed with passages opening to said chamber on opposite sides of each annulus, a valve member mounted for axial reciprocation in said chamber and being formed with a plurality of axially spaced annular channels one positioned in each annulus, a plurality of valve rings formed of soft resiliently compressible material and with a rectangular cross section having substantially parallel radial sides mounted in said channels and projecting outwardly therefrom and providing flexibly supported outer cylindrical surfaces slidably engaging the interior cylindrical walls of said annuli, said channels having outwardly diverging side walls spaced from outward portions of said ring sides to permit flexure thereof, said annuli being formed with a multiplicity of circumferentially spaced fingers axially extending from confronting ends thereof guiding said valve rings into and out of engagement with the cylindrical walls for selectively preventing and providing communication between said passages, said valve rings being positioned on said valve member and connected thereby for joint reciprocation between mutually exclusive positions in which one of said rings is in nonsealing engagement with said fingers of one annulus while the other valve ring is in sealed engagement with the cylindrical wall of another annulus and vice versa.

(References on following page)

References Cited

UNITED STATES PATENTS

| | | | |
|---|---|---|---|
| 1,045,644 | 11/1912 | Vauclain et al. | 137—625.68 |
| 1,046,944 | 12/1912 | Bartram | 137—625.68 |
| 2,630,135 | 3/1953 | Johnson | 137—625.69 XR |
| 2,910,081 | 10/1959 | Karbowniczek | 137—625.68 |
| 184,599 | 11/1876 | Ehrhardt | 285—364 XR |
| 597,388 | 1/1898 | Brown | 137—625.6 |
| 2,328,468 | 8/1943 | Laffly | 285—334.2 |
| 2,328,469 | 8/1943 | Laffly | 285—334.2 |
| 2,887,127 | 5/1959 | Broadbent | 251—367 XR |
| 2,912,007 | 11/1959 | Johnson | 137—625.64 XR |
| 3,145,467 | 8/1964 | Bodine | 29—525 |
| 3,315,702 | 4/1967 | Passaggio | 137—625.64 |
| 1,870,848 | 8/1932 | Hewitt | 137—625.66 |
| 3,017,901 | 1/1962 | Hicks | 251—331 |
| 3,457,943 | 7/1969 | Kawabata | 137—269 |

FOREIGN PATENTS 1,025,831  1/1953  France.

HENRY T. KLINKSIEK, Primary Examiner

U.S. Cl. X.R.

29—451, 525; 137—269; 251—331, 367; 285—334.2, 334.4

UNITED STATES PATENT OFFICE
CERTIFICATE OF CORRECTION

Patent No. 3,516,442  June 23, 1970

William O. Munroe

It is certified that error appears in the above identified patent and that said Letters Patent are hereby corrected as shown below:

Column 1, line 14, "and" should read -- to --; line 15, "machanisms" should read -- mechanisms --; line 39, "wel" should read -- well --; line 40, "operations" should read -- operational --; line 66, "coperating" should read -- cooperating --. Column 2, line 65, "including" should read -- include --. Column 5, line 47, "612" should read -- 616 --; line 57, "place" should read -- placed --; line 73, "regin" should read -- region --. Column 6, line 10, "tthe" should read -- the --.

Signed and sealed this 16th day of March 1971.

(SEAL)
Attest:

Edward M. Fletcher, Jr.  WILLIAM E. SCHUYLER, JR.
Attesting Officer  Commissioner of Patents